Oct. 25, 1932.  I. E. STOOPS  1,884,350
DISPENSING DEVICE
Filed Dec. 7, 1931
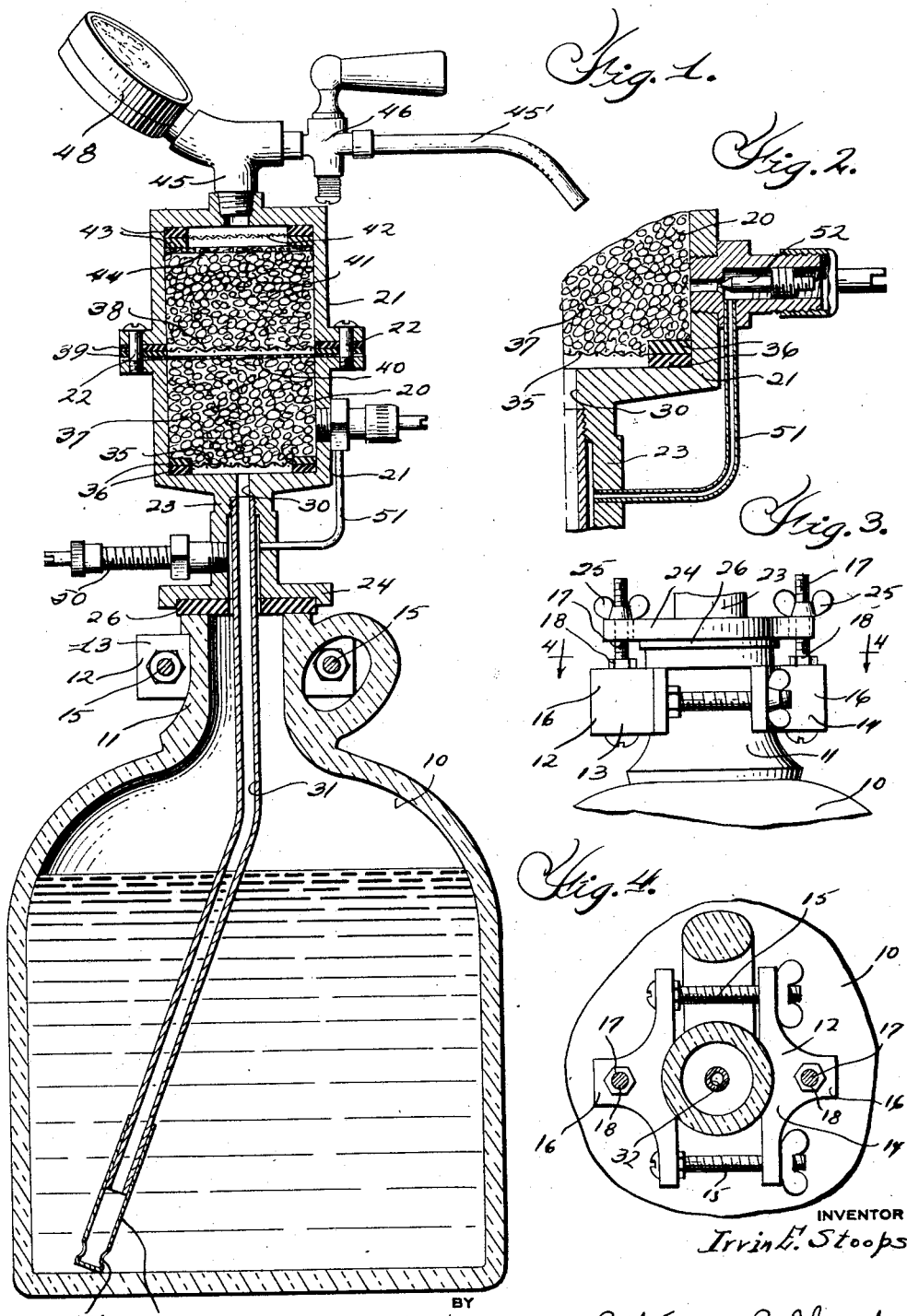
INVENTOR
Irvin E. Stoops Patented Oct. 25, 1932

1,884,350

UNITED STATES PATENT OFFICE

IRVIN E. STOOPS, OF DETROIT, MICHIGAN

DISPENSING DEVICE

Application filed December 7, 1931. Serial No. 579,617.

This invention relates to dispensing devices and has particular reference to improvements in devices for dispensing beverages or the like.

One of the principal objects of this invention is to provide a compact and relatively simple dispensing device in the form of an attachment capable of being readily assembled with or removed from a receptacle containing the beverage to be dispensed and having means in association therewith for carbonating the beverage prior to dispensing the same.

A further advantageous feature of this invention resides in the provision of a dispensing device of the type previously set forth wherein the beverage is simultaneously filtered and carbonated during its passage through the device.

The foregoing as well as other objects will be made more apparent as this description proceeds, especially when considered in connection with the accompanying drawing, wherein:

Figure 1 is a sectional view through a dispensing device constructed in accordance with the present invention and showing the same in association with a beverage container.

Figure 2 is an enlarged fragmentary sectional view featuring the means provided herein for carbonating the beverage;

Figure 3 is an elevational view of a portion of the structure shown in Figure 1 illustrating the manner in which the device is adapted to be clamped to the receptacle;

Figure 4 is a sectional view taken on the line 4—4 of Figure 3.

Referring now to the drawing, it will be noted that there is illustrated in Figure 1 a beverage container 10 which may be of any suitable construction. In the present instance, the container is shown for the purpose of illustration as being in the form of a jug having a reduced neck portion 11 of conventional design and serving as a support for my improved dispensing device about to be described.

While the dispensing device may be detachably secured to the neck of the container in any suitable manner, nevertheless, I have shown herein a clamp 12 for accomplishing the above result. The clamp preferably includes a pair of separable portions 13 and 14 held in clamping position on the neck of the container by means of suitable bolts 15 and each of the latter portions are provided with laterally extending ears 16 projecting outwardly from opposite sides of the neck. Extending upwardly from the ears 16 is a pair of bolts 17 having nuts 18 threaded thereon and engaging the upper surfaces of the ears for holding the bolts firmly in the latter.

The dispensing device comprises a filter housing 20 formed of separable half sections 21 arranged in superposed relation and having annular flanges projecting laterally outwardly from the open ends thereof adapted to be secured together by means of a series of studs 22. The lower section of the housing is provided with a depending tubular extension 23 terminating at the lower end thereof in a plate 24 having openings therein at points in vertical alignment with the bolts 17 extending from the ears of the clamp for receiving the threaded ends of these bolts. The plate 24 and accordingly the dispensing device is secured to the clamp 12 by means of suitable wing nuts 25 threadedly mounted on the bolts 17 and engageable with the plate. In order to effect a fluid-tight joint between the top of the container and the plate 24, a suitable seal or washer 26 is preferably interposed therebetween as clearly shown in Figure 1 of the drawing. The extension 23 is provided with a centrally arranged bore 30 communicating with the interior of the housing and having a threaded portion for detachably securing the upper end of the tube 31 within the extension. The bore 30 is counterbored as at 32 so as to provide an annular space within the extension around the upper end of the tube establishing communication between the extension and the interior of the container. As shown particularly in Figure 1, the tube extends to a point adjacent the bottom of the container 10 and is provided with an extension 33 at the lower end thereof. The extension 33 telescopically engages the tube for adjustment relative thereto and is provided with laterally directed openings 34 in the lower end thereof through which the beverage is permitted to flow into the tube.

For the purpose of filtering the beverage during its passage through the device, I provide a screen 35 within the lower half section 20 of the housing. The marginal edges of the screen 35 are preferably vulcanized between annular rubber washers 36 so as to facilitate assembly of the screen with the housing. Packed in the housing above the screen 35 is a quantity of filtering material such, for example, as filtering moss designated in Figure 1 of the drawing by the reference character 37. A second screen 38 is preferably located within the housing above the filtering material 37 and having the marginal edges thereof extended between a pair of washers located between the sections of the housing and clamped to the screen by means of the bolts 22. Cooperating with the second screen 38 and located below the same is a felt filter 40 having the marginal edges thereof also clamped between the sections aforesaid of the housing. In order to obtain maximum filtering of the beverage prior to dispensing the same, the upper half section of the housing is also filled with a quantity of filtering material such as filter moss 41 and the filtering action of the latter is augmented by a third screen 42 located above the filtering material 41 and having the marginal edges thereof vulcanized between the annular rubber washer 43. A second felt filter 44 may also be associated with the third screen 42, if desired, in the manner clearly shown in Figure 1.

In order to permit the discharge of beverage from the housing and accordingly from the beverage container 10, I provide a discharge pipe 45 substantially T-shaped and having the stem thereof communicating with the interior of the upper half of the the housing 20. Threadedly engaging one of the lateral extensions of the T-coupling is a suitable faucet 45′ provided intermediate its ends with a valve 46 for controlling the discharge of beverage from the housing and thus from the beverage container. The other lateral extension of the T-coupling is preferably bent upwardly slightly and serves as a mounting for a suitable pressure gage 48.

In order to create a pressure head in the container 10 above the beverage so as to force the latter upwardly through the dispensing device, I provide a fitting 50 secured to the extension 23 and communicating with the interior of the latter. The fitting 50 preferably contains a one-way valve of any desired character whereby a fluid under pressure may be forced into the container 10, but cannot escape from the container by way of this fitting. Any suitable pressure creating device may be connected to the valve fitting 50 for supplying gas under pressure to the container as will be readily apparent.

As previously stated, it is one of the principal objects of this invention to provide means for carbonating the beverage during the passage of the same from the container through the filtering means hereinbefore described to the dispensing nozzle 45′. For accomplishing the foregoing results, I provide a conduit 51 having one end communicating with the chamber in the extension 23 surrounding the tube 31 and having the opposite end communicating with the interior of the housing 20. The arrangement is such as to permit a portion of the gas discharged into the container 10 through the fitting 50 to pass through the conduit 51 directly into the housing 20 containing the filtering means specified above. Thus, it will be apparent that when it is desired to carbonate the beverage, a suitable carbonating fluid such as carbon-dioxide is discharged into the container through the fitting 50. The carbonating fluid thus discharged into the container not only creates a pressure head on the beverage therein to force the beverage upwardly through the stem and filtering means to the faucet 45′, but also flows through the conduit 51 into the filtering material in the housing 20 so that the beverage upon passing upwardly through the filtering material will be thoroughly carbonated. In order to control the flow of the carbonating fluid through the conduit 21 and to close communication through the conduit 51 when it is not desired to carbonate the beverage, I provide a suitable needle valve 52 in the conduit 51.

In use and with the beverage to be dispensed in the container 10, the filtering and dispensing device is merely connected to the neck of the container by means of the clamp 12 hereinbefore set forth. After the dispensing device has been properly clamped to the container, assurance is made that both the valves 46 and 52 are closed and a carbonating fluid under pressure is then forced into the container through the fitting 50 so as to build up a pressure head in the container above the beverage. The valve 46 may then be opened and the beverage will be forced outwardly through the tube 31 and through the several screens, felt washers and filtering material to the faucet 45′. Thus, from the foregoing arrangement, it will be apparent that a forcible filtering of the beverage will be effected prior to its discharge from the container. In the event it is also desired to carbonate the beverage prior to dispensing the same, the valve 52 is also opened so as to permit the carbonating fluid to flow from the container through the passage 51 into the housing 20 where it is allowed to intermingle with the filtering material and thereby effectively carbonate the beverage passing through this material. The above arrangement is such that when it is not desired to carbonate the beverage, the valve 52 may be closed causing all of the carbonating fluid to flow into the container to build up a pressure therein. In this connection, it is to be noted that owing to the fact that the carbonating fluid is considerably lighter in weight than the beverage, there will be no tendency for this fluid to penetrate the beverage in the container 10. However, when it is not desirable to carbonate the beverage, a gas other than a carbonating fluid such as air is preferably employed to dispense the beverage in the container 10.

From the above, it will be seen that the invention provides a filtering and dispensing device capable of being readily connected to a beverage container. It will further be observed that the device, in addition to being extremely simple and compact in construction, provides for efficiently filtering and carbonating the beverage prior to dispensing the same.

What I claim as my invention is:

1. In a dispensing device, a beverage container, a faucet, a tube communicating with the interior of said beverage container for conducting the beverage from the container to the faucet, a filter interposed between the tube and faucet, and means for carbonating the beverage during its passage through the filter.

2. A dispensing device fashioned for attachment to a beverage container, comprising a faucet, a tube communicating with the interior of the beverage container, a housing establishing communication between the tube and faucet, and means operable to discharge a carbonating fluid into said housing for carbonating the beverage during its passage through the housing from the tube to the faucet.

3. In a dispensing device, a beverage container, a faucet, a tube communicating with the interior of the beverage container, a housing establishing communication between the tube and faucet, means for discharging a carbonating fluid into said housing, and means for regulating the quantity of carbonating fluid admitted into said housing.

4. In a dispensing device, a beverage container, a tube communicating with the interior of the beverage container, a faucet, a filter housing establishing communication between the tube and faucet, means providing for the introduction of fluid under pressure into said container to force the beverage therein through the tube and filtering housing to said faucet, and means for by-passing a portion of said fluid directly into said filtering housing.

5. In a dispensing device, a beverage container, a faucet, a tube communicating with the interior of said beverage container, a housing interposed between the faucet and tube establishing communication therebetween, means providing for the introduction of a carbonating fluid into the housing to carbonate the beverage during its passage therethrough to the faucet, and valve means for regulating the quantity of carbonating fluid discharged into said housing.

6. In a dispensing device, a beverage container, a tube communicating with the interior of said beverage container, a distributing conduit communicating with the discharge end of the tube, and means for carbonizing the beverage during its passage from the tube to the conduit.

7. In a dispensing device, a beverage container, a faucet, a tube communicating with the interior of said beverage container, a housing establishing communication between the tube and faucet, means providing for the introduction of a carbonating fluid under pressure into said container to force the beverage therein through the tube and housing to said faucet, and means for discharging regulated quantities of said fluid directly into said housing for carbonizing the beverage during its passage therethrough.

8. In a dispensing device, a beverage container, a faucet, a tube communicating with the interior of said beverage container, a housing containing a filtering material interposed between the faucet and tube establishing communication therebetween, and means for discharging a carbonating fluid into said filtering housing for carbonizing the beverage during its passage through the filtering material to the faucet.

9. In a dispensing device, a beverage container, a faucet, a tube communicating with the interior of the beverage container, a housing containing a filtering material interposed between the tube and faucet establishing communication therebetween, means providing for the introduction of a carbonizing fluid under pressure into the container to force the beverage therein through the tube and filtering material to said faucet, means for conducting fluid discharged by the means aforesaid directly into the housing for carbonizing the beverage during its passage through the filtering material to the faucet, and means for regulating the quantity of the fluid discharged into said housing.

10. In a dispensing device, a beverage container, a filter housing, means detachably clamping the filter housing to the beverage container, a faucet communicating with the upper end of the filter housing, a tube communicating with the lower end of the filter housing and adapted to extend into the container to a point adjacent the bottom thereof, means associated with the filter housing and providing for the introduction of carbonizing fluid under pressure into said container to force the beverage therein through the tube and filter housing to said faucet, and means for by-passing predetermined quantities of the fluid discharged into the container by the aforesaid means directly into the filter housing for carbonizing the beverage during its passage through the housing to the faucet.

11. A dispensing device attachable to a beverage container, comprising a filter housing having a depending tubular extension communicating with the interior of the container, a faucet communicating with the upper end of the filter housing, a tube connected to the lower end of the filter housing and projecting therefrom through the tubular extension in spaced relation to the side walls thereof and having a portion adapted to extend within the container to a point adjacent the bottom of the same, means communicating with the interior of the tubular extension providing for the introduction of a carbonizing fluid under pressure into the container to force the beverage therein through the tube and filter housing to the faucet, and means establishing communication between the tubular extension and interior of the filter housing for discharging a quantity of carbonizing fluid directly into said housing to carbonize the beverage during its passage therethrough.

In testimony whereof I affix my signature.

IRVIN E. STOOPS.